US008100805B2

(12) United States Patent
Dayton

(10) Patent No.: US 8,100,805 B2
(45) Date of Patent: Jan. 24, 2012

(54) ELECTRONICALLY CONTROLLED LOCKING DIFFERENTIAL HAVING LOGIC-CONTROL WIRE HARNESS

(75) Inventor: Terry Andrew Dayton, Battle Creek, MI (US)

(73) Assignee: Eaton Corporation, Southfield, MI (US)

( * ) Notice: Subject to any disclaimer, the term of this patent is extended or adjusted under 35 U.S.C. 154(b) by 436 days.

(21) Appl. No.: 12/468,894

(22) Filed: May 20, 2009

(65) Prior Publication Data

US 2010/0298082 A1  Nov. 25, 2010

(51) Int. Cl.
*F16H 48/30* (2006.01)
*F16H 48/20* (2006.01)

(52) U.S. Cl. ........................... 475/150; 475/231
(58) Field of Classification Search ........... 475/150, 475/153, 154, 221, 231
See application file for complete search history.

(56) References Cited

U.S. PATENT DOCUMENTS

| 4,754,835 | A | 7/1988 | Stelter et al. ............... 180/248 |
| 5,130,657 | A | 7/1992 | Hornung ..................... 324/415 |
| 6,083,134 | A | 7/2000 | Godlew ...................... 475/231 |
| 6,309,321 | B1 | 10/2001 | Valente ....................... 475/249 |
| 6,551,209 | B2 | 4/2003 | Cheadle et al. ............. 475/150 |
| 6,609,357 | B1 | 8/2003 | Davis et al. ................ 56/10.2 A |
| 7,162,346 | B2 | 1/2007 | Berry et al. ................. 701/48 |
| 7,264,569 | B2 | 9/2007 | Fox .............................. 475/241 |
| 2002/0155913 | A1* | 10/2002 | Fusegi et al. ............... 475/150 |
| 2004/0093974 | A1 | 5/2004 | Nesseth ..................... 74/473.12 |
| 2005/0279607 | A1* | 12/2005 | Fusegi ........................ 192/84.96 |
| 2007/0142155 | A1 | 6/2007 | Schumacher ............... 475/150 |
| 2008/0116896 | A1 | 5/2008 | Skinner ....................... 324/418 |
| 2009/0011889 | A1* | 1/2009 | Donofrio et al. ............ 475/150 |

FOREIGN PATENT DOCUMENTS

| EP | 1 300 279 A2 | 4/2003 |
| WO | WO 03/070507 A1 | 8/2003 |

* cited by examiner

*Primary Examiner* — Edwin A Young
(74) *Attorney, Agent, or Firm* — Bliss McGlynn, P.C.

(57) ABSTRACT

An electronically controlled locking differential includes an electromagnetic coil and a wire harness adapted to logically control operation of the differential and having a circuit. The circuit has a latching switch that is electrically connected to a first source of power and adapted to provide latching power of the differential. A double-pole, double-throw control relay is electrically connected to the latching switch and includes a first switch, a second switch, and a coil. The second switch is adapted to "jump" the latching switch. The circuit is disabled when power to the harness is turned off and in "standby" mode when power to the harness is turned on. Upon the latching switch being activated, current flows from a starting point of the circuit through the circuit to activate the relay, the first switch closes to energize the differential, the second switch closes such that the current "jumps" the latching switch, and the differential is actuated.

20 Claims, 3 Drawing Sheets

ELECTRONICALLY CONTROLLED
LOCKING DIFFERENTIAL HAVING
LOGIC-CONTROL WIRE HARNESS

BACKGROUND OF THE INVENTION

1. Field of the Invention

The present invention relates, in general, to electronically controlled locking differentials and, in particular, to an electronically controlled locking differential having a wire harness adapted to logically control operation of the differential.

2. Description of the Related Art

In automotive applications, an electronically controlled locking differential of the related art may be actuated manually and is designed expressly for a four-wheel-drive (4WD) vehicle to allow the differential to be locked or unlocked when it is so desired. The driver can lock the front and/or rear wheels by manually activating a switch or button mounted to a dash or console of the vehicle. This type of torque-controlling device is well-known in the aftermarket. More specifically, an aftermarket system including the differential can be installed using a wire harness, a gear-service kit, locking-mechanism kit, stator/armature kit, and universal-wiring kit. This aftermarket differential should be actuated only under certain conditions—in particular, when the vehicle requires 4WD functionality or is traveling relatively slowly (no greater than about 10 mph).

However, once the driver of the 4WD vehicle manually activates the electronically controlled differential, the differential remains powered until the driver manually deactivates it, typically by pushing a button or throwing a switch. In practice, the differential may remain unnecessarily powered, possibly for even a substantial length of time before the driver deactivates the switch. Furthermore, if the differential remains powered when the vehicle is turned off, the differential is automatically re-powered when the vehicle is turned back on, even when operation of the differential is not actually desired. In addition, the driver may inadvertently bump and, thus, dangerously activate the switch when the vehicle is traveling at highway speeds, say, 70 mph. In any event, unnecessary operation of the differential causes unnecessary locking of an axle of the 4WD vehicle when it is moving, which, in turn, causes premature wear of the differential and related parts and the axle and corresponding tires. Moreover, as a consequence of the differential frequently being powered unnecessarily for extended periods of time, the battery of the 4WD vehicle may prematurely die.

Thus, there is a need in the related art for an electronically actuated locking differential that provides control, power, traction, and off-road performance to a 4WD vehicle. There is also a need in the related art for such a differential that prevents actuation of it when 4WD functionality is not necessary or the vehicle is not traveling relatively slowly. There is also a need in the related art for such a differential that controls momentary "on/off" latching and drop-out power of the differential. There is also a need in the related art for such a differential that does not cause premature wear to related parts and the axle and corresponding tires and is safer to passengers. There is also a need in the related art for such a differential that helps provide longer life to the battery of the vehicle. In particular, there is a need in the related art for an aftermarket electronically-actuated-locking-differential system that incorporates these features.

SUMMARY OF THE INVENTION

The present invention overcomes the disadvantages in the related art in an electronically controlled locking differential that includes an electromagnetic coil and a wire harness adapted to logically control operation of the differential and having a circuit. The circuit has a latching switch that is electrically connected to a first source of power and adapted to provide latching power of the differential. A double-pole, double-throw control relay is electrically connected to the latching switch and includes a first switch, a second switch, and a coil. The second switch is adapted to "jump" the latching switch. The circuit is disabled when power to the harness is turned off and in "standby" mode when power to the harness is turned on. Upon the latching switch being activated, current flows from a starting point of the circuit through the circuit to activate the relay, the first switch closes to energize the differential, the second switch closes such that the current "jumps" the latching switch, and the differential is actuated.

The electronically controlled locking differential of the present invention provides control, power, traction, and off-road performance to a 4WD vehicle. Also, momentary "on/off" latching and drop-out power of the differential is controlled. And, actuation of the differential is prevented when 4WD functionality of the vehicle is not desired or necessary or the 4WD vehicle is not traveling relatively slowly. Furthermore, operation of the differential is logically controlled such that the differential is automatically disengaged and, thus, unlocked when the 4WD vehicle is out of first gear or reverse. In addition, wear of the differential and related parts and an axle and corresponding tires of the 4WD vehicle is not premature. Moreover, since the differential resets when power to the 4WD vehicle is turned off, the differential helps provide longer life to a battery of the vehicle. Plus, the harness of the differential can be a part of an aftermarket electronically-actuated-locking-differential system. The harness of the differential can be employed with OEM applications as well.

Other objects, features, and advantages of the present invention are readily appreciated as the same becomes better understood while reading the subsequent description taken in conjunction with the accompanying drawings.

BRIEF DESCRIPTION OF EACH FIGURE OF THE DRAWING

DETAILED DESCRIPTION OF EMBODIMENTS OF THE INVENTION

Figure 1:
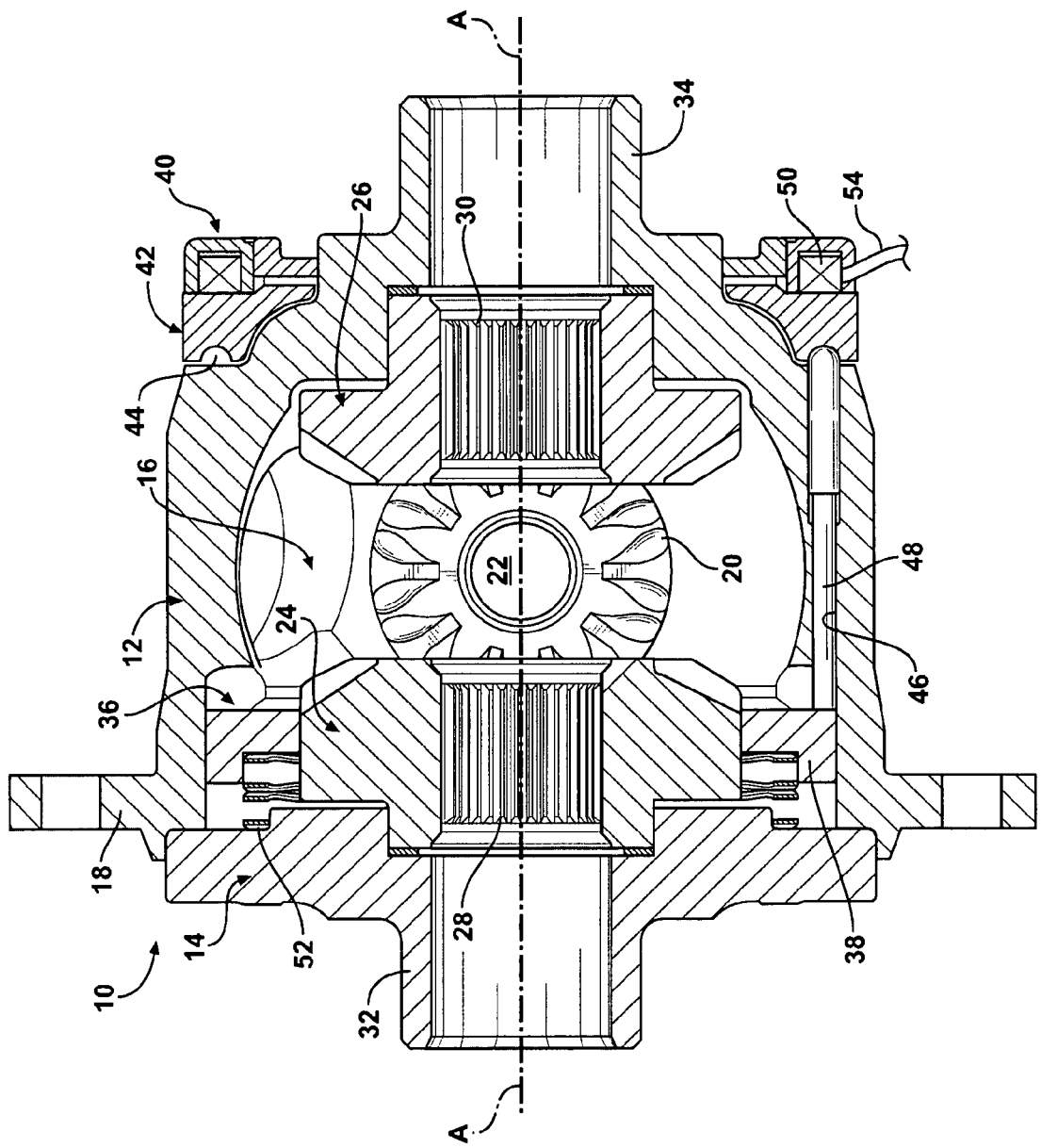
FIG. 1 is an axial cross-sectional view of an electronically controlled locking differential of the present invention showing the differential in its actuated, locked mode.
Figure 2:
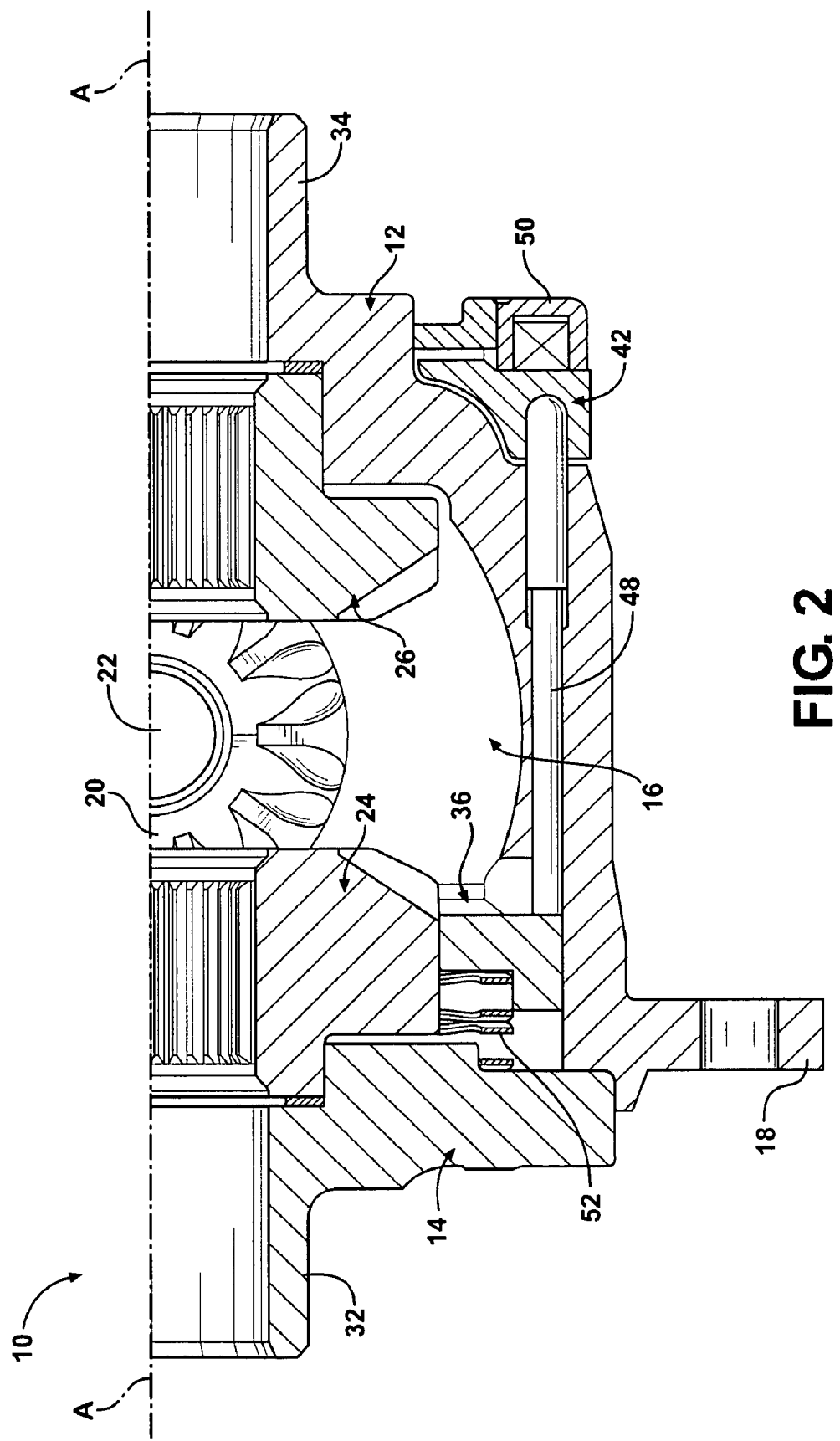
FIG. 2 is an enlarged fragmentary axial cross-sectional view of the differential illustrated in FIG. 1 showing the differential in its non-actuated, unlocked mode.

Referring now to the figures, where like numerals are used to designate like structure, one embodiment of an electronically controlled locking differential that the wire harness of the present invention can logically control is generally indicated at 10. It should be appreciated by those having ordinary skill in the related art that the differential 10 can be employed in 4WD vehicles, in particular, and any suitable vehicles, in general. It should also be appreciated that the wire harness of the present invention can be employed with any suitable electronically controlled locking differential. The one described below and shown in FIGS. 1 and 2 is only exemplary, and the wire harness can be employed with an electronically controlled locking differential that is structurally and functionally different than this one. It should also be appreciated that the wire harness can be employed by an OEM or the aftermarket. In the latter case, the wire harness is only part of a system that may also include a gear-service kit, locking-mechanism kit, stator/armature kit, and universal-wiring kit (not shown or described). Those having ordinary skill in the related art should be able to assemble the differential to a vehicle (not shown) using just the wire harness, various kits, and necessary tools.

As shown in FIGS. 1 and 2, the differential 10 includes a gear case, generally indicated at 12, and an end cap, generally indicated at 14, which may be fastened to the gear case 12 by any suitable fastener, such as by a plurality of bolts (not shown). The gear case 12 and end cap 14 cooperate with each other to define a gear chamber, generally indicated at 16. Torque input to the differential 10 is typically by an input ring gear (not shown), which may be attached to a flange 18. A gear set is supported within the gear chamber 16 and has at least a pair of input pinion gears 20 (only one of which is shown). The pinion gears 20 are mounted rotatably about a pinion shaft 22, which is secured relative to the gear case 12 by any suitable means. The pinion gears 20 are input gears of the gear set and in meshing engagement with a respective pair of left and right side gears, generally indicated at 24, 26. The side gears 24, 26 define respective sets of internal, straight splines 28, 30 that are adapted to be in splined engagement with mating external splines on a respective pair of left and right axle shafts (not shown). The gear case 12 defines annular hub portions 32, 34 on which may be mounted a respective pair of bearing sets (not shown) that are used to provide rotational support for the rotating differential 10 relative to an outer housing or carrier (not shown).

A rotation-prevention mechanism, generally indicated at 36, has a generally annular collar member 38 and is disposed entirely within the gear case 12 and operably associated with side gear 24 (the first output gear). An actuator, generally indicated at 40, is disposed primarily external to the gear case 12. More specifically, the actuator 40 is disposed at the end of and about the gear case 12 adjacent side gear 26 (the second output gear) and has a single ramp plate, generally indicated at 42, that defines a plurality of ramp surfaces 44. The gear case 12 defines a plurality of cylindrical openings 46 within each of which is slidably disposed an elongated, generally cylindrical actuation member 48. There is one ramp surface 44 for each actuation member 48. A locking mechanism of the differential 10 consists of the collar member 38 and actuation members 48. The actuator 40 also has an electromagnetic coil, generally indicated at 50, that exerts a required retarding torque on the ramp plate 42, thus initiating ramp-up of the actuation members 48. The collar member 38 is biased toward the non-actuated, "unlocked" mode by a wave spring 52. The electromagnetic coil 50 is energized by a pair of electrical leads 54.

During normal, straight-ahead operation of a vehicle within which the differential 10 is employed, no differentiation occurs between the left and right axle shafts or side gears 24, 26. Therefore, the pinion gears 20 do not rotate relative to the pinion shaft 22. As a result, the gear case 12, pinion gears 20, and side gears 24, 26 all rotate about an axis of rotation "A" as if the gear case 12, pinion gears 20, and side gears 24, 26 are a solid unit.

The differential 10 may be controlled manually, wherein a driver of the vehicle manually selects "locked" mode (rather than "unlocked" mode) to operate the differential 10. For example, when, say, the vehicle is at rest, the driver simply manually activates a switch or button (not shown), such as a simple momentary-type "on/off" toggle or rocker switch or push button, mounted to a dash or console (not shown) of the vehicle. In this way, an electric circuit (which is described below) is closed, thereby turning on current in the circuit and a lamp (not shown) located in or near the toggle switch or push button to indicate to the driver that the differential is actuated. Current flows in the circuit and ultimately to the electromagnetic coil 50 of the differential 10. The differential 10 then operates in the "locked" mode (i.e., when the vehicle is in first gear or reverse). In this way, the first output gear 24 is locked relative to the gear case 12, preventing any further differentiation between the first output gear 24 and gear case 12. FIG. 1 shows the differential 10 in its actuated, "locked" mode, and FIG. 2 shows the differential 10 in its non-actuated, "unlocked" mode.

Figure 3:
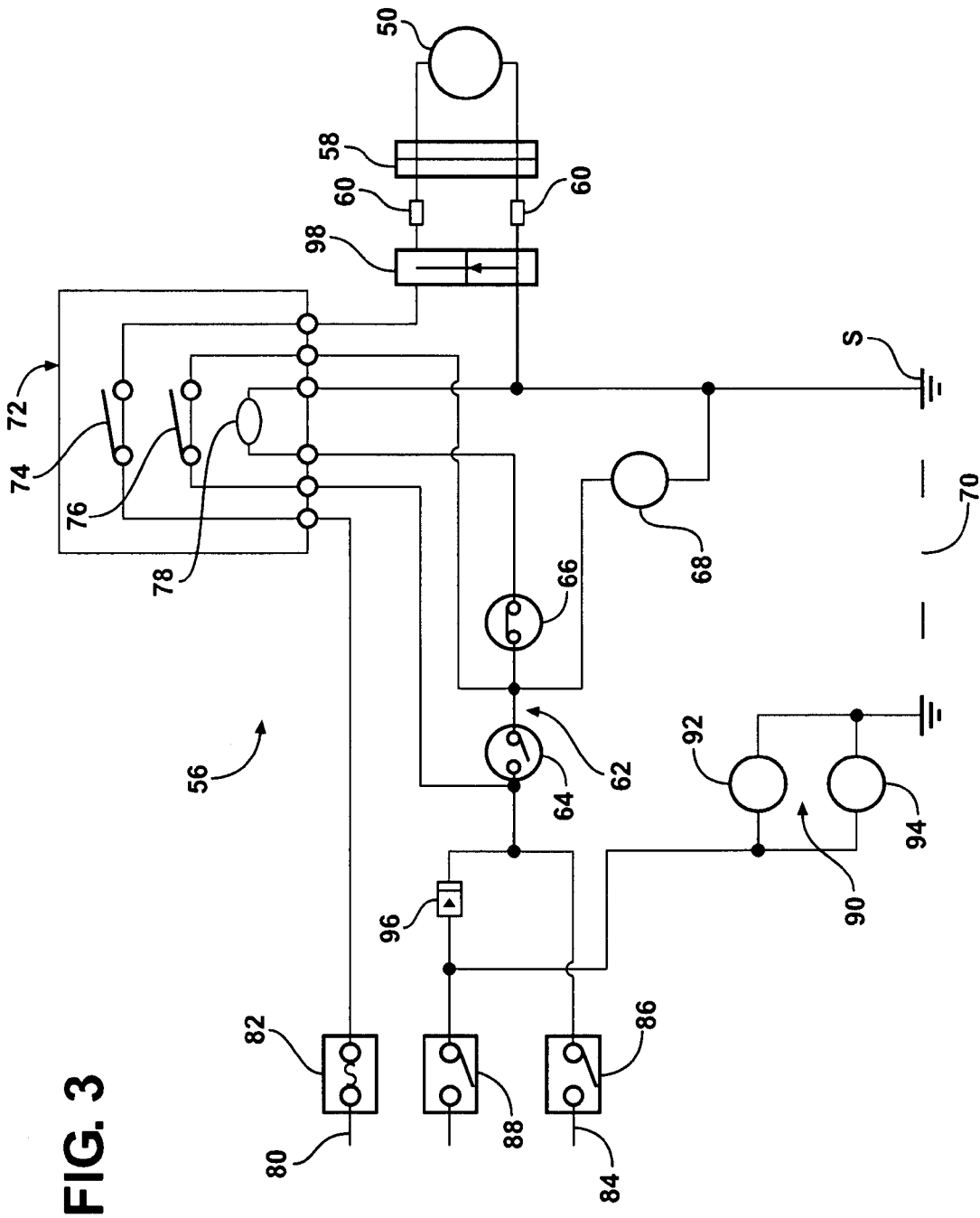
FIG. 3 is a schematic view of a circuit of a wire harness of the present invention that logically controls the electronically controlled locking differential illustrated in FIGS. 1 and 2.

FIG. 3 depicts a circuit, generally represented at 56, of the logic-control wire harness for the differential 10. More specifically, the circuit 56 depicts the electromagnetic coil 50 of the differential 10 and a pigtail or two-pin connector 58 that is adapted to plug into a pair of butt-joint connectors 60 of the harness. (The pigtail 58 can be a part of the electromagnetic coil 50.) In this way, the differential 10 is electrically connected to the harness. A toggle or latching switch is generally represented at 62 and includes an "on" switch 64, which is normally open, and an "off" switch 66, which is normally closed. The toggle switch 62 is adapted to provide latching "on/off" power and an "open/closed" combination and electrically connected to the lamp, which is represented at 68 and is adapted to indicate to the driver that the differential 10 is actuated when the lamp 68 is illuminated. The lamp 68, in turn, is electrically connected to a chassis 70 upon which the wire harness is mounted and circuit 56 is grounded.

The "on" and "off" switches 64, 66 are electrically connected to a double-pole, double-throw control relay, generally represented at 72, that includes a first switch 74, a second switch 76, and a coil 78. In FIG. 3 and with respect to each other, the first switch is shown as the top switch 74, and the second switch is shown as the bottom switch 76. More specifically, the top switch 74 includes a set of contacts for high current, the bottom switch 76 includes a set of contacts for low current, and the coil 78 introduces a counter-EMF into the circuit 56 when current changes. In one embodiment, the relay 72 may be a "Tyco VF28 Series" relay. The bottom switch 76 is adapted to "jump" the "on" switch 64.

A source of power, such as a 12-volt battery 80, is electrically connected to a fuse, such as a 10-amp fuse 82, which, in turn, is electrically connected to the relay 72. This combination is adapted to provide 12-volt/10-amp maximum switching. The battery 80 is electrically connected also to the "on" switch 64. Another source of power, such as a 12-volt switched ignition or key switch 84, is adapted to provide a high-side-fault drop-out and is electrically connected to a first-gear switch 86, which, in turn, is electrically connected to the "on" and "off" switches 64, 66. The first-gear switch 86 is a micro-switch that is normally open. The first-gear switch 86 is closed, via mechanical linkage to a shift lever of the vehicle, only when the vehicle is in first gear.

A reverse switch 88 is electrically connected to and, thereby, adapted to receive current from an existing 12-volt source of power—such as the battery 80 or switched ignition 84—and closed, via mechanical linkage to a shift lever of the vehicle, only when the vehicle is in reverse. The reverse switch 88 is also electrically connected to a "reverse" light, generally represented at 90, of the vehicle. The "reverse" light includes a pair of lamps 92, 94 and is adapted to indicate that the vehicle is in reverse when lamps 92, 94 are illuminated. Lamps 92, 94, in turn, are electrically connected to the chassis 70 (ground). The reverse switch 88 is electrically connected also to a diode 96 that is adapted to conduct current to the "on" and "off" switches 64, 66. In one embodiment, the diode 96 may be a "1N5402" diode. Furthermore, an in-line diode 98 is disposed adjacent the butt-joint connectors 60 and adapted to conduct current to the relay 72 and dampen a reverse-bias-voltage spike.

The relay 72 is activated by a signal from any of the battery 80, first-gear switch 86, reverse switch 88, and "on" and "off" switches 64, 66 and controls current by diverting it to the chassis 70 (ground), electromagnetic coil 50 of the differential 10, or the in-line diode 98. In addition, when the vehicle changes from first gear to reverse, the circuit 56 reactivates. Moreover, once power to the vehicle is open, the circuit 56 drops.

It should be appreciated by those having ordinary skill in the related art that the circuit 56 can be electrically connected to each of the differential 10, battery 80, and switched ignition 84 by any suitable means. It should also be appreciated that the first and second switches 74, 76 can have any suitable relationship with each other. It should also be appreciated that the relay 72 can be any suitable type of relay. It should also be appreciated that each of diodes 96, 98 can be any suitable type of diode. It should also be appreciated that the two-pin connector 58 and in-line diode 98 can be stock. It should also be appreciated that the first-gear switch 86 and reverse switch 88 can be closed when the vehicle is in first gear and reverse, respectively, via any suitable manner, such as by a computer command. It should also be appreciated that a path of flow of current through the circuit 56 can start at any suitable point of the circuit 56.

In operation, when power from the switched ignition 84 is turned off, all functions of the circuit 56 are disabled, and, thus, there is no flow of current within the circuit 56. However, when power from the switched ignition 84 is turned on, the circuit is in "standby" mode. In this mode, twelve volts of direct current "wait" at the "on" switch 64 for activation of the differential 10, and there still is no flow of current within the circuit 56. In particular and as shown in FIG. 3, the volts are positioned to the immediate left of the "on" switch 64.

Upon the driver activating the toggle switch 62 (pushing the toggle switch 62 to an "on" position), current flows from a starting point "S," which is located at the chassis 70 (ground) in FIG. 3, to and through coil 78 to and through the "off" switch 66, which is normally closed. The current continues to and through the "on" switch 64 to the fuse 82 to, thereby, activate the relay 72. Upon such activation, the top switch 74 closes to, in turn, energize the electromagnetic coil 50 of the differential 10. Meanwhile, the bottom switch 76 closes such that current "jumps" the "on" switch 64 and the differential 10 is actuated to the "locked" mode. As a result, lamp 68 is illuminated to indicate to the driver that the differential 10 is actuated.

The differential 10 remains locked until the toggle switch 62 is pushed to an "off" position or power from the switched ignition 84 is interrupted or turned off. Either way, the circuit 56 drops or falls out, and, in turn, the differential 10 is unlocked. As a result, lamp 68 shuts off to indicate to the driver that the differential 10 is not actuated. And, the differential 10 is not re-actuated (and lamp 68 is not re-illuminated) until the driver commands the circuit 56 to actuate the differential 10.

The harness allows control of the differential 10 while providing safety features to the differential 10. Operation of the harness is based upon a latching-relay system and incorporates the double-pole, double-throw control relay 72. The harness provides momentary "on/off" control with a power latch or hold function of the differential 10 and external safety inputs from a line of the switched ignition 84. The harness also protects against false actuation of the differential 10 and, thus, eliminates unnecessary or undesired draw of current from the vehicle and non-commanded use of the differential 10.

The differential 10 provides control, power, traction, and off-road performance to the 4WD vehicle. Also, momentary "on/off" latching and drop-out power of the differential 10 is controlled. And, actuation of the differential 10 is prevented when 4WD functionality of the vehicle is not desired or necessary or the 4WD vehicle is not traveling relatively slowly. Furthermore, operation of the differential 10 is logically controlled such that the differential 10 is automatically disengaged and, thus, unlocked when the 4WD vehicle is out of first gear or reverse. In addition, wear of the differential 10 and related parts and the axle and corresponding tires of the 4WD vehicle is not premature. Moreover, since the differential 10 resets when power to the 4WD vehicle is turned off, the differential 10 helps provide longer life to the battery of the vehicle. Plus, the harness of the differential 10 can be a part of an aftermarket electronically-actuated-locking-differential system. The harness of the differential 10 can be employed with OEM applications as well.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An electronically controlled locking differential comprising:
   an electromagnetic coil; and
   a wire harness adapted to logically control operation of said differential and including:
      a circuit having:
         a latching switch that is electrically connected to a first source of power and adapted to provide latching power of said differential; and
         a double-pole, double-throw control relay that is electrically connected to said latching switch and includes a first switch, a second switch, and a coil, said second switch being adapted to "jump" said latching switch;
         wherein said circuit is disabled when power to said harness is turned off and in "standby" mode when power to said harness is turned on and, upon said latching switch being activated, current flows from a starting point of said circuit through said circuit to activate said relay, said first switch closes to energize said differential, said second switch closes such that current "jumps" said latching switch, and said differential is actuated.

2. An electronically controlled locking differential as set forth in claim 1, wherein said first switch includes a set of contacts for high current, said second switch includes a set of contacts for low current, and said coil is adapted to introduce a counter-EMF into said circuit when current changes.

3. An electronically controlled locking differential as set forth in claim 1, wherein said wire harness is mounted and said circuit is grounded upon a chassis.

4. An electronically controlled locking differential as set forth in claim 1, wherein said wire harness further includes an in-line diode that is adapted to conduct current to said relay and dampen a reverse-bias-voltage spike.

5. An electronically controlled locking differential as set forth in claim 1, wherein said wire harness further includes a connector that is adapted to plug into said electromagnetic coil to electrically connect said electromagnetic coil to said wire harness.

6. An electronically controlled locking differential as set forth in claim 1, wherein said latching switch includes an "on" switch that is normally open and adapted to be "jumped" by said second switch and an "off" switch that is normally closed, wherein upon said "on" switch being activated, current flows from said starting point of said circuit through said circuit to activate said relay, said first switch closes to energize said differential, said second switch closes such that current "jumps" said "on" switch, and said differential is actuated.

7. An electronically controlled locking differential as set forth in claim 6, wherein said circuit further includes a first-gear switch that is electrically connected to a second source of power and said "on" and "off" switches and normally open, said first-gear switch being closed only when a vehicle within which said differential is being employed is in first gear.

8. An electronically controlled locking differential as set forth in claim 7, wherein said circuit further includes a reverse switch that is electrically connected to either of said first and second sources of power and said "on" and "off" switches and normally open, said reverse switch being closed only when the vehicle is in reverse.

9. An electronically controlled locking differential as set forth in claim 8, wherein each of said first-gear switch and reverse switch is closed via mechanical linkage to a shift lever of the vehicle.

10. An electronically controlled locking differential as set forth in claim 8, wherein said reverse switch is electrically connected to a diode that is adapted to conduct current to said "on" and "off" switches.

11. A wire harness adapted to logically control operation of an electronically controlled locking differential, said wire harness comprising:
    a circuit including:
        a latching switch that is electrically connected to a first source of power and adapted to provide latching power of the differential; and
        a double-pole, double-throw control relay that is electrically connected to said latching switch and includes a first switch, a second switch, and a coil, said second switch being adapted to "jump" said latching switch;
    wherein said circuit is disabled when power to said harness is turned off and in "standby" mode when power to said harness is turned on and, upon said latching switch being activated, current flows from a starting point of said circuit through said circuit to activate said relay, said first switch closes to energize the differential, said second switch closes such that said current "jumps" said latching switch, and the differential is actuated.

12. A wire harness as set forth in claim 11, wherein said first switch includes a set of contacts for high current, said second switch includes a set of contacts for low current, and said coil is adapted to introduce a counter-EMF into said circuit when current changes.

13. A wire harness as set forth in claim 11, wherein said wire harness is mounted and said circuit is grounded upon a chassis.

14. A wire harness as set forth in claim 11, wherein said wire harness further includes an in-line diode that is adapted to conduct current to said relay and dampen a reverse-bias-voltage spike.

15. A wire harness as set forth in claim 11, wherein said wire harness further includes a connector and the differential includes a connector that is adapted to plug into said connector of said wire harness to electrically connect the differential to said wire harness.

16. A wire harness as set forth in claim 11, wherein said latching switch includes an "on" switch that is normally open and adapted to be "jumped" by said second switch and an "off" switch that is normally closed, wherein upon said "on" switch being activated, current flows from said starting point of said circuit through said circuit to activate said relay, said first switch closes to energize the differential, said second switch closes such that current "jumps" said "on" switch, and the differential is actuated.

17. A wire harness as set forth in claim 16, wherein said circuit further includes a first-gear switch that is electrically connected to a second source of power and said "on" and "off" switches and normally open, said first-gear switch being closed only when a vehicle within which the differential is being employed is in first gear.

18. A wire harness as set forth in claim 17, wherein said circuit further includes a reverse switch that is electrically connected to either of said first and second sources of power and said "on" and "off" switches and normally open, said reverse switch being closed only when the vehicle is in reverse.

19. A wire harness as set forth in claim 18, wherein each of said first-gear switch and reverse switch is closed via mechanical linkage to a shift lever of the vehicle.

20. A wire harness as set forth in claim 18, wherein said reverse switch is electrically connected to a diode that is adapted to conduct current to said "on" and "off" switches.

* * * * *